E. H. SHERBONDY.
VALVE MOUNTING.
APPLICATION FILED MAY 14, 1918.
1,436,976.
Patented Nov. 28, 1922.
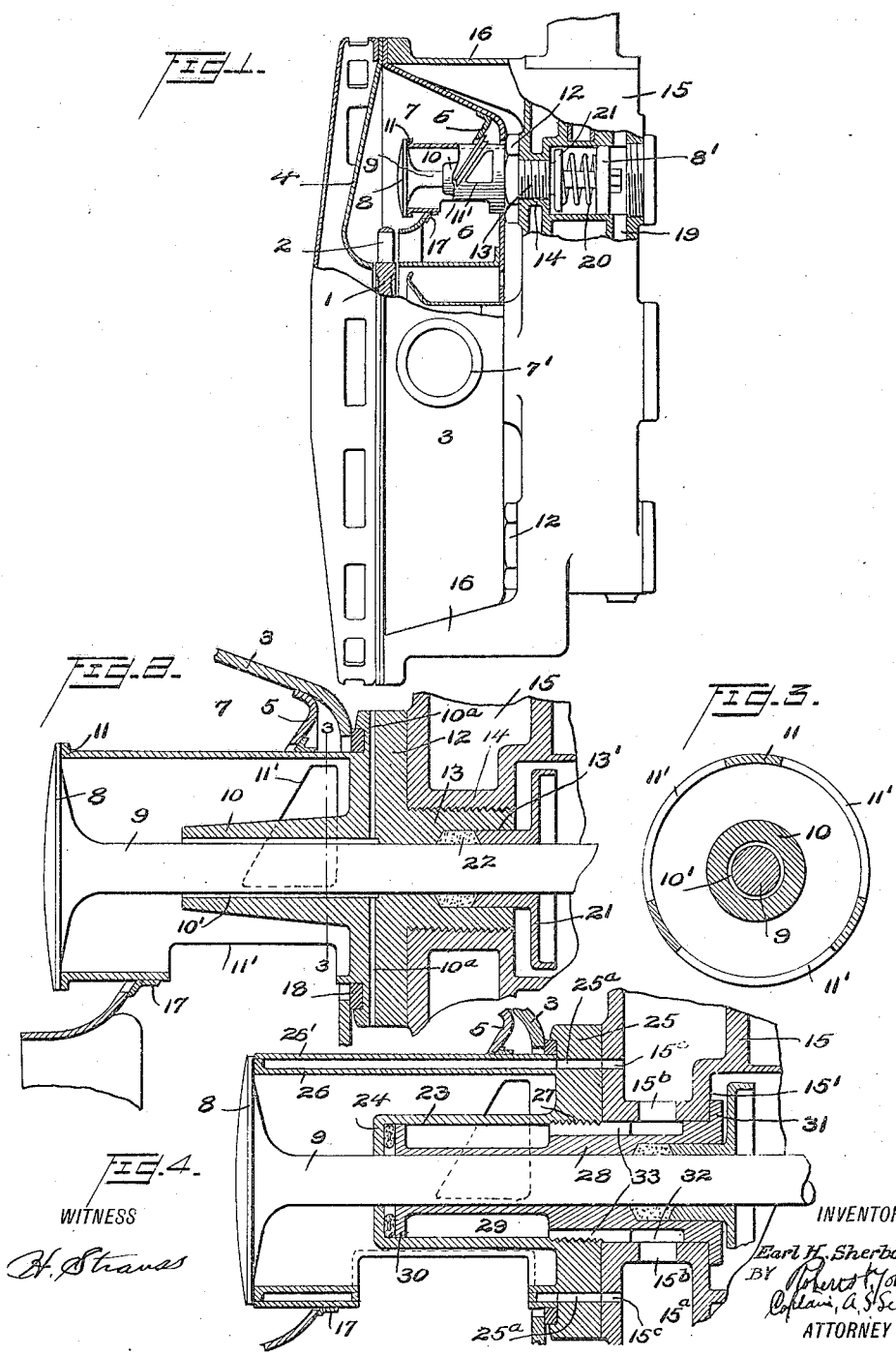

Patented Nov. 28, 1922.                                                            1,436,976

UNITED STATES PATENT OFFICE.

EARL H. SHERBONDY, OF CLEVELAND, OHIO.

VALVE MOUNTING.

Application filed May 14, 1918.   Serial No. 234,554.

*To all whom it may concern:*

Be it known that I, EARL H. SHERBONDY, a citizen of the United States, residing at Cleveland, in the county of Cuyahoga and State of Ohio, have invented certain new and useful Improvements in Valve Mountings, of which the following is a specification.

This invention relates to a valve mounting for a valve intended to be used in connection with a turbine that is operated by the waste gases from an internal combustion engine.

The turbine in question may be used as a part of a turbine compressor unit that is mounted on an airplane engine, as more particularly set forth in my co-pending case, Serial No. 224,356, filed March 23, 1918.

The mentioned valve is a by-pass valve, intended to control the amount of the waste gas that goes to the buckets of the turbine. It is an object of this invention to provide a mounting means for this valve, whereby it may be readily mounted in place in the turbine casing.

It is a further object of the invention to provide a valve collar and a valve seat made integral, whereby the assembly of the parts is simplified.

It is a further object of the invention to provide means for cooling the valve stem, either by leading a cooling medium directly into contact therewith, or by providing a cooling jacket around said valve stem and leading a cooling medium into said jacket.

It is a further object of the invention to cause the cooling medium to circulate by virtue of the injector action of the fluid rushing past the valve stem.

It is a further object of the invention to provide means for cooling the valve seat.

A still further object of the invention is to provide telescoping valve collars, which define between them a jacket for a cooling medium, and one or both of which may carry means for engaging a collar housing, which means becomes operative in mounting the valve collars in position upon tightening of the mentioned threaded collars.

Other objects and advantages will appear as the description proceeds.

In the drawings, Fig. 1 shows the valve and associated parts in position in a turbine casing; Fig. 2 is a sectional view on an enlarged scale, of the valve shown in Fig. 1; Fig. 3 is a section on the line 3—3 of Fig. 2; and Fig. 4 is a view similar to Fig. 2 of an alternative form.

The turbine 1 carrying the usual buckets 2 is mounted in a casing comprising the main casing element 3, which is annular and shaped like a dish pan, as shown, and an annular back plate 4 engaging the casing 3 at their respective peripheries. Suitably positioned within the space defined by the elements 3 and 4 is a diaphragm 5, arranged to define annular inlet and exhaust chambers 6 and 7, respectively. The gas may be led into the chamber 6 by suitable pipes (not shown), and may escape therefrom through one or more pipes 7'. The arrangement of these pipes is not material to this case, and is set forth in detail in my co-pending case, Serial No. 224,892, filed March 26, 1918.

Associated with and mounted to cooperate with the diaphragm 5 is a valve 8, provided with the usual valve stem 9. The annular collar 10 for the valve stem may have integral therewith the seat 11 for the valve, these just mentioned parts being integral with a disk-like body portion 12, and an annular exteriorly screw threaded part 13. The threaded part 13 cooperates with a threaded socket 14 in a valve control housing 15, which housing 15 is suitably mounted on the turbine casing by arms 16. Suitable apertures are provided in the diaphragm 5 and in the backing of the casing 3, for insertion therethrough of the valve collar 10 and valve seat 11. A sealing ring 17 may be provided to properly fasten the valve seat to the diaphragm 5.

The valve seat 11 is cut away as at 11', to provide suitable apertures opening into the inlet chamber 6. The gases that operate the turbine, inasmuch as they are the exhaust gas from an internal combustion engine, are very hot, and for that reason particular care is necessary to provide against the jamming of the valve stems. To this end collar 10 is cut away to define a passage 10' for a cooling medium, this passage being directly adjacent the valve stem 9. This passage 10' communicates with a passage 10ª, drilled through the portion 12, so that air or other cooling medium may be led to the passage 10'. The passage 10' opens directly into the space around the valve stem. When the valve 8 is open, the gases rush past the valve stem 9 at a high velocity, and due to the injector action thereof, will draw air or other cooling medium along the passage 10' from the passage 10ᵃ. The circulation of air will obviously tend to keep the valve stem cool. The loose fit afforded the valve stem by the passage 10' will also evidently tend to minimize jamming of this stem.

A gasket 18 may be positioned in a groove in the portion 12, to provide a proper seal between that portion and the casing 3.

The valve 8 is intended to be operated by piston 8', which in turn is intended to be operated by variations in the oil pressure in an oil line 19, as more particularly described in my co-pending case Serial No. 224,894 filed March 26, 1918. This feature being no part of this invention, is not further described here. The spring 20 may be positioned between the piston 8' and cup 21, which may surround the valve stem 9, and which is mounted in a recess 13' in the part 13 of the valve collar. A packing 22 may be provided, if desired.

Referring now to Fig. 4, there is shown a double-walled valve collar, comprising an outer wall 23, which may be flanged as at 24 at one end, and which is integral with the disk-like radially extending body portion 25 at the other end. The parts 23 and 25 may have integral therewith the valve seat element 26, which, with another valve seat element 26', is assembled to provide a double-walled valve seat for the valve 8.

The body portion 25 is interiorly screw threaded as at 27, to receive therein an inner collar element 28, which when assembled with the outer collar 23 defines a passage 29 for a cooling medium.

The collar 28 is flanged as at 30 and 31. Between the flanges 24 and 30 there may be positioned a McKim gasket. The flange 31 is adapted to engage a shoulder 15' of the housing 15, so that when the collars 23 and 28 are in position and the threads tightened, the flange 31 will be drawn into tight engagement with the shoulder 15' to hold the parts in proper position.

The housing 15 is provided with a passage 15ᵃ for a cooling medium. This cooling medium is led to the space 29 through holes 15ᵇ in the housing, into an annular groove 32 in the collar 28, and through the longitudinal grooves 33 in the same collar. The cooling medium enters through a lower hole 15ᵇ, and after passing through the space 29, escapes through the upper hole 15ᵇ. It is obvious that the valve stem is thereby kept cool, and jamming thereof, due to over-heating, is minimized.

The valve seat is also intended to be cooled by leading a cooling medium into the space between the walls 26 and 26' thereof. This cooling medium is led thereto through lower holes 15ᶜ in the housing, and 25ᵃ in the body portion 25 of the valve collar. The cooling medium enters through the lower holes 15ᶜ, and after passing through the space between the walls and valve seat, escapes through the upper holes 25ᵃ and 15ᶜ. This cooling of the valve seat prevents distortion thereof, and so aids in the proper positioning of the valve when closed.

As stated in connection with Fig. 2, the diaphragm 5 and casing 3 are suitably apertured to receive the valve seat and valve collar. The sealing ring 17 may be provided as in Fig. 2.

It will thus be seen that I have set forth a compact valve mounting, which may very readily be assembled in place in the turbine casing. The making of the valve seat integral with the valve collar eliminates the necessity of a separate mounting of the valve seat in the diaphragm 5, inasmuch as the valve seat is supported by means entirely without the diaphragm, that is to say, from the housing 15. Further, it should be noted that jamming and sticking of the valve is minimized by providing means both for cooling the valve stem and for cooling the valve seat.

While I have illustrated certain embodiments of my invention, it should be understood that the invention is not limited to the exact disclosures in these embodiments, but is capable of expression in other ways, as defined within the scope of the appended claims.

I claim—

1. In a valve mounting, the combination of an interiorly threaded valve stem collar having a radially extending body portion, a second exteriorly threaded collar fitting therein, said two collars defining between them a passage for a cooling medium when assembled, and said radially extending body portion and the second collar being adapted to clamp a housing between them, substantially as set forth.

2. In a valve mounting, the combination of an interiorly threaded valve stem collar having a radially extending body portion, a second exteriorly threaded collar fitting therein, said two collars defining between them a passage for a cooling medium when asembled, and said radially extending body portion and the second collar being adapted to clamp a housing between them, said housing acting as a mounting for said collars and serving to carry the cooling medium to and away from said collars, substantialy as set forth.

In testimony whereof I affix my signature.

EARL H. SHERBONDY.